Nov. 19, 1935.　　　L. R. LOVELETT　　　2,021,456
TUBULAR SAW RETAINING MEANS
Filed Oct. 22, 1934
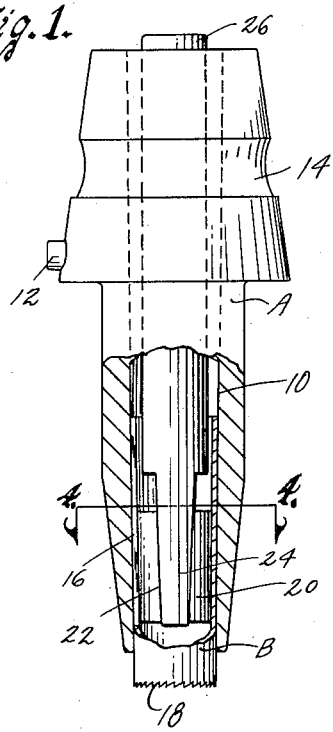
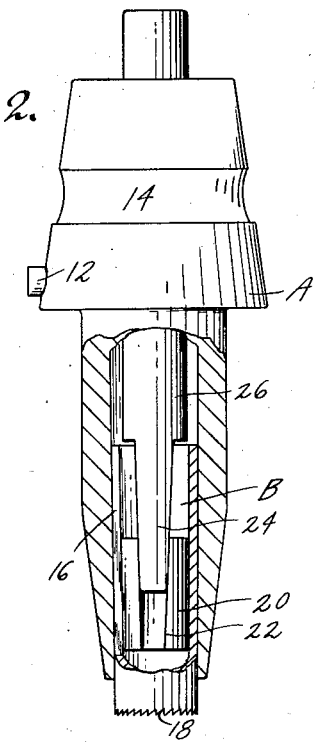
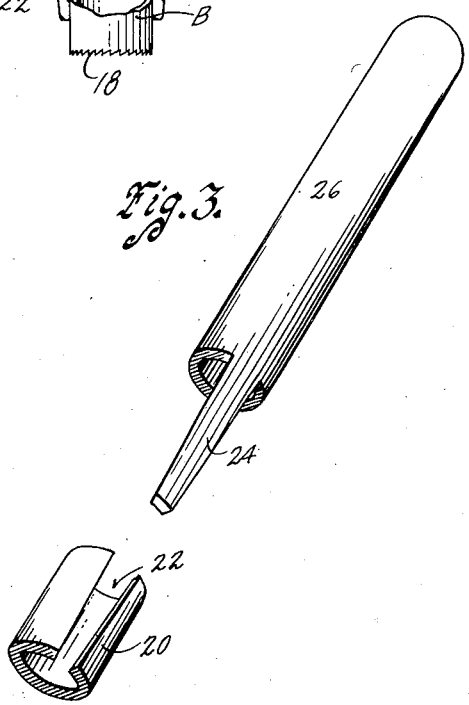
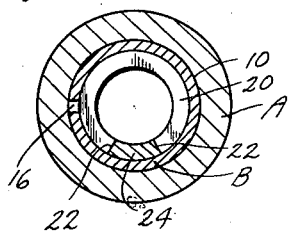
Witness
H. S. Munzenmaier
Inventor
Lloyd R. Lovelett
by Bair, Freeman & Sinclair
Attorneys Patented Nov. 19, 1935

2,021,456

UNITED STATES PATENT OFFICE 2,021,456

TUBULAR SAW RETAINING MEANS

Lloyd R. Lovelett, Washington, Iowa, assignor to American Pearl Button Company, Washington, Iowa Application October 22, 1934, Serial No. 749,400

6 Claims. (Cl. 79—16)

The object of my invention is to provide a tubular saw retaining means which is simple, durable and comparatively inexpensive to manufacture.

A further object is to provide means for retaining a split tubular button saw or the like within a holder spool, the means being adjustable to effectively retain saws having material of varying thicknesses without the retaining means assuming a different and undesired position longitudinally of the spool because of such varying thicknesses.

Still a further object is to provide a tubular saw retaining means which will firmly and positively hold the saw tight within the spool at the proper distance from the cutting edge and which will permit the saw to run true.

Still a further object is to provide saw retaining means which will not spring the saw out of alignment and consequently will cause the saw to cut cleaner and permit uniform grinding and setting of the saw.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation, partly in section, of a tubular split saw within a spool, my improved retaining means being associated with the saw and spool to retain the saw in position.

Figure 2 is a similar view showing the retaining means in the same position but coacting with a saw having thicker material.

Figure 3 is a perspective view of the two elements of the retaining means; and

Figure 4 is an enlarged sectional view on the line 4—4 of Figure 1 showing the cross sectional relation of the parts of my retaining means to the tubular saw and to the spool which holds it.

On the accompanying drawing, I have used the reference character A to indicate a spool or other holding device for a tubular saw B. The spool A is tubular in character, having a slightly tapered bore 10 to receive the saw B. The spool may be provided with a holding pin 12 and a groove 14 to coact with parts of the chuck on a button cutting machine with which the spool is detachably associated, this however forming no part of my present invention and therefore not being shown on my drawing.

The saw B is of the ordinary tubular split type, the slot being indicated at 16 and one end of the tube being provided with sharpened cutting teeth 18.

My retaining means comprises a split sleeve 20, the slot thereof being indicated at 22 and being tapered. The sleeve 20 is of such diameter that it snugly fits the interior surface of the saw B. The sleeve 20 is expandable and contractible, it being made of spring steel or similar material.

My retaining means further includes a wedge element 24 for coaction with the slot 22 and a tubular guide shank 26 extending from the wedge element 24. The sides of the wedge 24 are tapered, preferably at the same angle as the sides of the slot 22 in the sleeve 20.

In operation, the tubular saw B, before or after it is sharpened and set, is pushed into the bore 10 of the spool A to about the position shown. In this position, the sharpened end of the tubular saw extends far enough from the lower end of the spool to cut through a thick mussel shell to form a button blank. It is desirable that the saw be rigidly retained in the spool A with the retainer at a position adjacent the sharpened end of the saw. The sleeve 20 is accordingly inserted into the saw, this being accomplished most easily by inserting it from the upper end of the spool A. After it has reached the desired position, the wedge 24 with its shank 26 is inserted in the spool, the shank serving as a guide and the wedge 24 entering the slot 22. The wedge may then be driven into the slot by tapping the upper end of the shank 26 with a hammer or the like until the saw is tight within the bore 10.

If the material of the saw is exceptionally thick, the sleeve 20 can still be inserted to the desired position after which the wedge can be driven in position, but as shown in Figure 2, it cannot be driven in as far. The comparative thicknesses of the saw material in Figures 1 and 2 are greatly exaggerated as ordinarily these thicknesses do not vary more than a few thousandths of an inch.

My device makes it possible to have the retainer at the desired position regardless of the thickness of the saw, whereas when a taper pin is driven into the saw as is now the general custom, a thick saw will keep it from going in far enough to rigidly hold the saw adjacent its cutting end, while a thin one will permit it to go in so far that it interferes with the button blank being cut, especially when the blank is comparatively thick.

By my construction, the sleeve 20 can be placed in any position desired and can be tightened in such position by driving the wedge element 24 into the slot 22 until it is of the desired tightness therein. This construction also prevents any twisting or springing of the saw as experienced with taper pins as the saw when inserted naturally assumes a true position and this position is not disturbed by the expanding sleeve 20 rather than a longitudinally driven taper pin.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with a split tubular saw and a tubular spool for holding the saw, means for retaining said saw within said spool comprising an expandable split sleeve cooperating with the interior surface of said saw, a wedge drivable into the slot of said split sleeve and a guide shank integral with said wedge and extending axially through said tubular spool.

2. In combination with a tapered split tubular saw and a tubular spool for holding said saw, means for retaining said saw within said spool comprising a tapered expandable split sleeve cooperating with the interior surface of said saw, a wedge drivable into the slot of said split sleeve and a guide shank integral with said wedge and extending axially through said tubular spool.

3. In combination with a split tubular saw and a spool for holding the saw, means for retaining said saw within said spool comprising an expandable split sleeve cooperating with the interior surface of said saw and a wedge member drivable into the slot of said split sleeve, said wedge comprising an elongated shank element of slightly less outside diameter than the inside diameter of said saw and a wedge element extending axially from one end thereof and located adjacent the periphery of the shank element.

4. In combination with a split tubular saw and a spool for holding the saw, means for retaining said saw within said spool comprising an expandable split sleeve cooperating with the interior surface of said saw, a wedge drivable into the slot of said split sleeve and a guide shank on said wedge.

5. Means for retaining a split tubular saw within the bore of a spool or the like comprising a longitudinally split sleeve, the slot thereof being tapered and a wedge to be driven axially relative to said sleeve and to said slot, said wedge having integrally formed thereon, a shank extending through and guided by the bore of said spool.

6. Means for retaining a split tubular saw within the bore of a spool or the like comprising a split sleeve, the slot thereof being tapered, a wedge to be driven into said slot and a guide shank on said wedge.

LLOYD R. LOVELETT.